United States Patent [11] 3,597,733

[72] Inventor Warren R. Foxwell
Park Ridge, Ill.
[21] Appl. No. 8,630
[22] Filed Feb. 4, 1970
[45] Patented Aug. 3, 1971
[73] Assignee Honeywell Inc.
Minneapolis, Minn.

[54] CABLE RECEIVER
10 Claims, 2 Drawing Figs.

[52] U.S. Cl. .......... 340/147 R, 340/147 LP, 340/152
[51] Int. Cl. .......... H04q 9/00
[50] Field of Search .......... 340/147, 152

[56] References Cited
UNITED STATES PATENTS
3,320,590 5/1967 Rovell .......... 340/147
3,495,217 2/1970 Brooks .......... 340/147

*Primary Examiner*—Donald J. Yusko
*Attorneys*—Lamont B. Koontz and Omund R. Dahle ABSTRACT: A cable receiver for use in the connection of a central station to a plurality of groups of remote stations with the use of transmitting and receiving apparatus at the central station and at the remote stations to transmit and receive serially coded messages comprising a plurality of bits in binary form. A pulse transformer in series with the cable at each receiver location detects the binary transmission from the central station through one branch or channel of the receiver and detects the binary transmission from a still more remote group of remote stations through another channel of the receiver. When one channel of the receiver is receiving a bit, the other channel is disabled. This disabling is caused to extend slightly beyond the end of transmission of each bit so that the collapsing field of the input transformer occurring at the trailing edge of each transmitted bit does not cause a false signal through the other channel.

PATENTED AUG 3 1971 3,597,733

INVENTOR.
WARREN R. FOXWELL
BY Omund R. Dahle
ATTORNEY.

CABLE RECEIVER

BACKGROUND OF THE INVENTION

Cable receivers, for use in the connection of a central station, have been known and in use for some time and have been described in publications such as the Bell System Technical Journal of Sept., 1964, particularly the article by Connell, Hussey and Ketchledge entitled "No. 1 ESS Bus System," pages 2,021—2,054. The receivers of that reference utilize a current transformer having the primary winding in series with the cable as a signal current detector. The single turn primaries in series with the line consume only a minor fraction of the power being transmitted and in addition there are only minor effects in signal transmission quality as a result of component failure of a single receiver including a shorted or open transformer secondary winding. The multiple cable receivers and cable drivers described in that reference may be scattered along the cable, however, it is emphasized that cable drivers (transmitters) should not be placed on both sides of a receiver along the cable, that is, the receivers are not bidirectional. The remedy suggested in that reference is to add a separate cable to handle transmission in the other direction. This lack of a bidirectional cable receiver is a limitation which is overcome in the present invention.

In the present invention, the cable receiver consists of a bidirectional signal detector having a pulse transformer used as a signal current detector. The transformer system operates in a bidirectional manner. Power consumed by each receiver is less than 1 percent of the power being transmitted. Since all signals transmitted in the system are positive pulses, the resulting signal currents will vary with the direction of signal propagation along the cable. Bidirectional signal detection is provided by the use of two channels in the receiver. Signals detected on one channel will disable the other channel on a bit-by-bit basis. There is a delay in the enabling of the disabled channel to allow the transformer to recover quickly. The recovery time of the transformer is controlled by a damping resistor across the secondary winding. The present invention has the necessary function of providing a low impedance from the primary winding to the line on flux buildup, or presence of pulse, and a high impedance on pulse termination, or flux collapse, regardless of signal propagation direction.

SUMMARY OF THE INVENTION

A bidirectional cable receiver having an input transformer connected in series with the cable and the receiver being adapted to provide a pulse output of the same character when a positive pulse is received regardless of from which direction on the transmission line it is received. The receiver has one channel or branch for reception of pulses from one direction and a second channel for reception of pulses from the other direction, the two channels having a common output. The transmitted pulses are of short duration and as each pulse terminates, the field collapses in the transformer causing an unwanted transient potential which would result in an error in the receiver output. The error signal would be transmitted through the opposite channel from that responding to the pulse and therefore in this invention the opposite channel is disabled during the time one channel is receiving to prevent the transient pulse from reaching the receiver output and causing an error.

DESCRIPTION

Figures 1, 2:
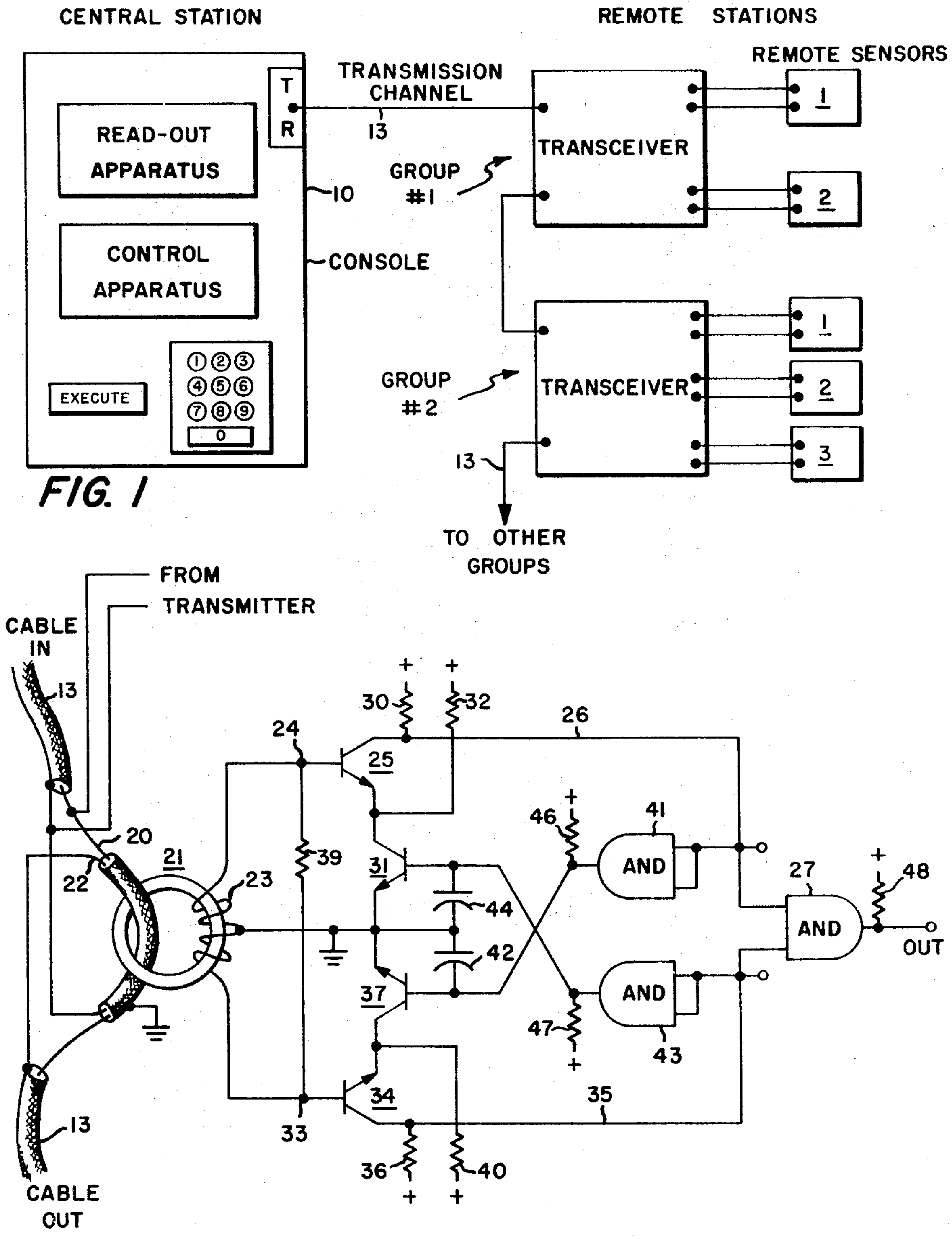
FIG. 1 is a diagrammatic representation of a building air-conditioning system having a central station and a plurality of groups of remote stations serially connected by a single communication channel or two-conductor cable, the central station and the groups of remote stations each having a cable receiver which is the subject matter of the invention.
FIG. 2 is a schematic diagram of the cable receiver and shows a preferred embodiment of the invention.

Referring now to FIG. 1, there is shown in diagrammatic form a temperature control and supervision system for a building air-conditioning system, such as is described in the copending application of James R. Berrett et al., Ser. No. 864,679, filed Oct. 8, 1969, and which has a central station 10 and a plurality of remote groups of stations 1 and 2 interconnected by a single communication channel or two-conductor cable 13 which may be a coaxial cable if desired. In each group of stations 1 or 2 and the central station there is included a bidirectional signal detector or receiver as part of a transceiver TR adapted to receive binary pulses which are transmitted on the cable 13 either from the direction of the central station or from the direction of a more distant remote group. The transceiver is capable of transmitting and receiving high-speed digital signals in the order of 50,000 bits per second.

In FIG. 2 the receiver of a transceiver is shown in greater detail and it may be seen that the first conductor of the cable 13 has connected in series with it one primary winding 20 of pulse transformer 21, transformer 21 also including a toroidal core, a second primary winding 22 and a center-tapped secondary winding 23. Similarly the second conductor of the "cable in" and "cable out" has in series therewith the second primary winding 22. Primary windings 20 and 22, each of which may be a single turn, are connected to provide common mode rejection at the transformer.

The upper terminal 24 of the secondary winding is directly connected to the base electrode of an NPN detector transistor 25, the collector of said transistor being connected by a conductor 26 to one input of an AND gate 27 and connected by a resistor 30 to a positive source of potential. The emitter electrode of transistor 25 is directly connected to collector electrode of another NPN control transistor 31 whose emitter is grounded. The collector of control transistor 31 is further connected by a resistor 32 to a positive potential to provide a constant current path to the transistor 31 to optimize switching characteristics of said transistor 31.

The lower terminal 33 of the secondary winding 23 is directly connected to the base electrode of a similar detector transistor 34, the collector of said transistor being connected by a conductor 35 to the other input of AND gate 27 and connected by a resistor 36 to a positive potential. The emitter electrode of transistor 34 is directly connected to the collector electrode of another control transistor 37 whose emitter is grounded. The collector of control transistor 37 is further connected by a resistor 40 to a positive potential.

Cross coupling is provided from the output lines 26 and 35 to the base or control electrodes of control transistors 31 and 37 and it may be seen that conductor 26 is also connected to both inputs of an AND gate 41, the output terminal of which is connected directly to the base of transistor 37. A capacitor 42 connected between the output terminal and ground operates as a delay means to provide a brief time delay between the occurrence of a positive-going change in signal level on conductor 26 and the similar positive-going change in potential being applied to the base electrode. Similarly, the conductor 35 is also connected to both inputs of an AND gate 43, the output terminal of which gate is connected directly to the base of transistor 31, and which connection also includes delay capacitor 44 connected in a similar manner to capacitor 42. It will be understood to those skilled in the art that the gates 27, 41, and 43 may have power terminals which are not shown and that the pullup resistors 46, 47 and 48 may be internal to the gates. While gate 27 provides a common output for both channels, separate outputs may also be taken from conductors 26 and 35, if desired. The separate outputs on 26 and 35 give direction of origin of transmission, one is exclusive to east to west propagation and the other is exclusive to west to east propagation.

OPERATION

In considering the operation of the cable receiver, as shown in FIG. 2, it will be understood that binary pulses are being transmitted on the transmission line 13 between the central station and the remote groups and vice versa. In a standby condition, therefore, the detector transistors 25 and 34 have no turn on bias applied to the base electrodes and these two transistors are not conductive. As a result, the positive source potential is applied through resistors 30 and 36 to conductors 26 and 35, respectively, so that both inputs to AND gate 27 are positive and the output thereof is positive in this standby condition, that is, in the absence of an input pulse. The positive potentials on conductors 26 and 36 are also applied to the inputs of AND gates 41 and 43. Gate 41 in response provides a positive turn on bias to control transistor 37 and gate 43 provides a positive turn on bias to control transistor 31.

A consideration of the series arrangement of detector transistor 25 and control transistor 31 shows that they cooperate, in effect, as a switching circuit. In other words, when both base electrodes are driven positive and then only the output on conductor 26 drops substantially to zero. In the standby condition established above, one input, the base electrode of transistor 31, has a positive potential applied thereto as a steady state condition.

The pulse transformer 21 which provides line isolation is used as the signal current detector. Upon the occurrence of a binary bit (square wave) being transmitted from the central station and being received "cable in," terminal 24 of winding 23 is made positive and a turn on current is caused to flow into the base of transistor 25 thus switching transistor 25 to a conductive state for the duration of the binary bit. Transistors 25 and 31 now both being conductive, a low impedance path is presented through them for conductor 26 to ground and the potential of conductor 26 drops substantially to zero. As the potential on the conductor 26 drops, the output of AND gate 27 also goes to zero as well as the output of AND gate 41. The changed output of AND gate 41 is applied to the base of control transistor 37 and it is rendered nonconductive and may be considered as a disabling or as an inhibit gate in series with transistor 34. At the end of the transmission of the binary bit, transistor 25 turns off, the potential on conductor 26 again goes positive, the output of AND gate 27 again goes positive, and the output of AND gate 41 again tends to rise. The delay capacitor 42 causes a momentary time period to elapse before the positive output of AND gate 41 is applied to the base of transistor 37 as a turn on bias.

At the end of the transmission of the binary bit, i.e., the trailing edge of the bit, the field induced in the transformer collapses and the inductive kick may cause an undesired voltage spike of the opposite polarity. This undesired voltage backswing, although limited by damping resistor 39, is of a nature to momentarily render transistor 34 conductive which would cause an erroneous signal to be transmitted to the other input of AND gate 27. As has been described above, however, control or inhibit transistor 37 is still in an inhibit or nonconductive condition because of time delay capacitor 42 and thus disabling the receiver channel so the transient turn on pulse to transistor 34 due to the collapsing field in transformer 21 has no effect at its output conductor 34 because no low impedance current path has been established from conductor 35 to ground. At the end of the delay time determined by capacitor 42, transistor 37 again becomes conductive but by this time the transient condition caused by the collapsing transformer field has been dissipated. Transistor 37 having resumed conduction, the combination of transistors 34 and 37 is again enabled and ready to receive a transmission from a group yet more remote on cable line 13 as is the combination of transistors 25 and 31 ready for succeeding transmission from the central station.

When a transmission of a binary bit from a more remote transmitter reaches the receiver of FIG. 2, although the pulse is positive, it is being transmitted in the opposite direction from that previously explained and the current transformer receives it in a reverse sense so that the lower terminal 33 of secondary winding 23 goes positive and a turn on current flows into the base electrode of transistor 34 thus switching transistor 34 to a conductive state. Transistors 34 and 37 now both being conductive, a low impedance path is presented through them from conductor 35 to ground and the potential of conductor 34 substantially to zero. As the potential on the conductor 35 drops, the output of AND gate 27 again goes to zero as well as the output of AND gate 43. The changed output of AND gate 43 is applied to the base of control or inhibit transistor 31 and it is rendered nonconductive to disable the receiver channel comprising transistor 25. Transistor 31, delay capacitor 44 and AND gate 43 perform the same function with respect to transistor 25 as transistor 37, delay capacitor 42 and AND gate 41 do with respect to transistor 34.

The embodiments of the invention in which I claim an exclusive property or right are defined as follows:

1. A bidirectional receiver adapted to receive serially coded messages wherein the receiver input circuit is connected in series with a transmission circuit which extends from a central station to a series of remote stations and on which circuit messages are transmitted in both directions and received from either direction at the receiver, said receiver comprising:

input circuit means having an input and two outputs wherein a first signal on said input provides an output signal at one of said two outputs upon a termination of said first signal an output signal is developed at the other of said two outputs, a first receiver channel including a control circuit and an output circuit, said input circuit means one output being connected in controlling relation to said control circuit so that upon the reception of a message pulse from a first direction on said transmission circuit said first channel provides an output signal indicative thereof;

a second receiver channel including a control circuit and an output circuit, said input circuit means other output being connected in controlling relation to said control circuit so that upon the reception of a message pulse from the opposite direction on said transmission circuit said second channel provides an output signal indicative thereof, controllable second-channel-disabling means controlled in response to the presence of a message pulse at said first receiver channel to disable said second receiver channel, and controllable first-channel-disabling means controlled in response to the presence of a message pulse at said second receiver channel to disable said first receiver channel.

2. The receiver according to claim 1 wherein said first receiver channel comprises a first normally nonconductive transistor having a control electrode in said control circuit and current-switching electrodes connected in said output circuit, so that upon said reception of said message pulse from said first direction said first transistor is rendered conductive to conduct current through said switching electrodes and provide said output signal, and wherein said second receiver channel comprises a second normally nonconductive transistor having a control electrode in said control circuit and current-switching electrodes connected in said output circuit so that upon said reception of said message pulse from said opposite direction said second transistor is rendered conductive to conduct current through said switching electrode and provide said output signal.

3. The receiver according to claim 2 wherein said controllable first-channel-disabling means comprises a first current-inhibiting gate having a normally conducting condition and being operated to an inhibit condition in response to said presence of said message pulse at said second receiver channel, said gate being connected in series with said first transistor current-switching electrodes, and said controllable second-channel-disabling means comprises a second current-inhibiting gate having a normally conducting condition and being operated to an inhibit condition in response to said presence of said message pulse at said first receiver channel, said gate being connected in series with said second transistor current-switching electrodes.

4. The receiver according to claim 3 and further comprising said first-channel-disabling means a buffer stage connecting a signal at said second receiver channel to said first current-inhibiting gate, and in said second-channel-disabling means another buffer stage connecting a signal at said first receiver channel to said second current-inhibiting gate.

5. The receiver according to claim 1 wherein said disabling means further includes delay means to prolong the disabling beyond the termination of said message pulse.

6. The receiver according to claim 1 and further comprising as an output circuit a combining gate, the first channel output signal and the second channel output signal being connected to the combining gate inputs to give a common output.

7. A two-channel pulse receiver comprising:

input transformer means including a primary winding having first and second terminals, said first terminal adapted to be connected to a transmission line from a first location and said second terminal adapted to be connected to a transmission line from a second location, said transformer means also including secondary winding means having first and second terminals, a first channel comprising;

normally nonconductive first current-switching means having a control electrode and a pair of current-carrying electrodes, said secondary winding means first terminal being connected to said control electrode in controlling relation thereto, normally conductive second current-switching means having a control electrode and a pair of current-carrying electrodes, said control electrode normally biased to conduction, said current-carrying electrodes of said first and second switching means being connected in series with each other and in series with first impedance means to a source of electrical power, an output circuit from the junction of said first impedance means and said switching means;

a second channel comprising;

normally nonconductive third current-switching means having a control electrode and a pair of current-carrying electrodes, said secondary winding means second terminal being connected in controlling relation to said control electrode;

normally nonconductive fourth current-switching means having a control electrode and a pair of current-carrying electrodes normally biased to conduction, said current-carrying electrodes of said third and fourth switching means being connected in series with each other and in series with second impedance means to said source;

an output circuit from the junction of said second impedance means and said switching means;

a first inhibit circuit connected from said first channel output circuit to said control electrode of said normally conductive fourth switching means and effective to turn off said fourth switching means and thus disable said second channel during the transmission of a pulse in said first channel; and a second inhibit circuit connected from said second channel output circuit to said control electrode of said normally conductive second current-switching means and effective to turn off said second switching means and thus disable said first channel during the transmission of a pulse in said second channel.

8. The invention in accordance with claim 7 wherein said first and second inhibit circuits each comprise a buffer stage.

9. The invention in accordance with claim 7 wherein said first and second inhibit circuits each further include delay means to prolong the disabling beyond the termination of said pulse.

10. The invention in accordance with claim 7 and further comprising as an output circuit a two-input-combining gate, the first channel output circuit and second channel output circuit being connected to the first and second inputs, respectively, to give a common output.